M. R. WOLFARD.
ROTARY HYDROPLANE.
APPLICATION FILED OCT. 8, 1917.
1,309,928.
Patented July 15, 1919.
4 SHEETS—SHEET 1.
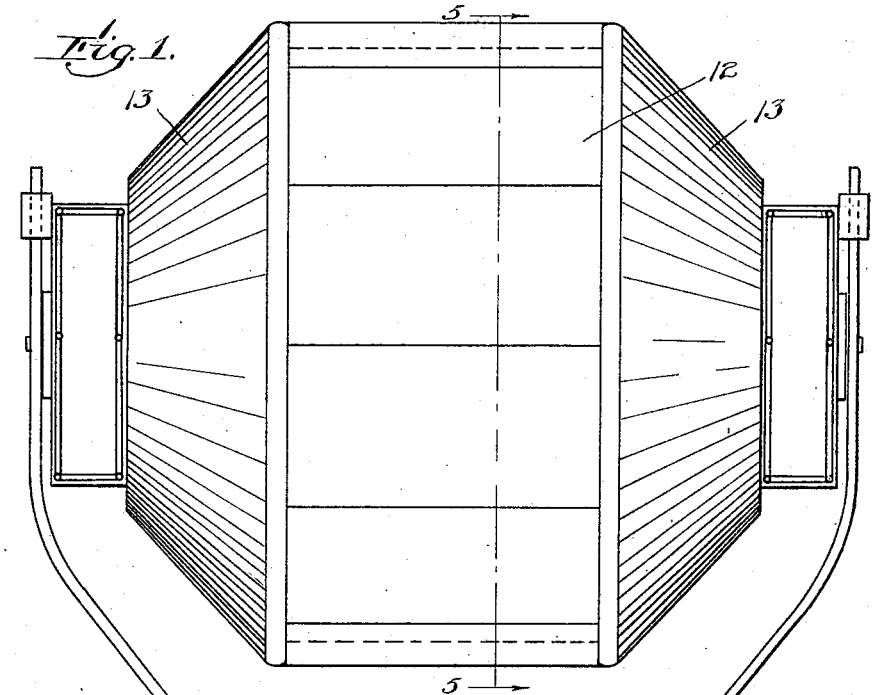
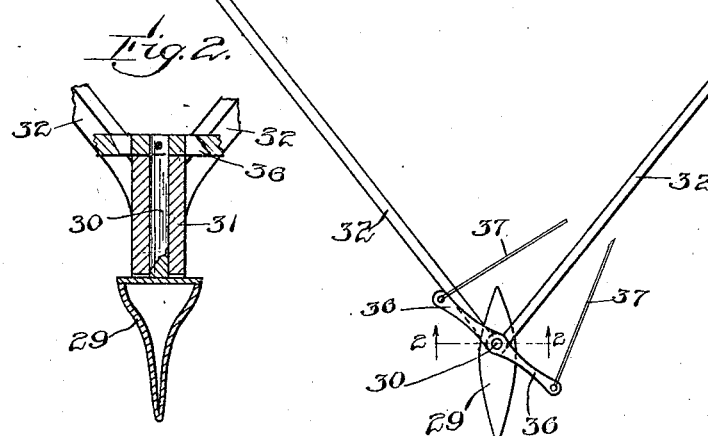
Inventor:
Merl R. Wolfard,
by Wright Brown Quinby May
Attorneys.

M. R. WOLFARD.
ROTARY HYDROPLANE.
APPLICATION FILED OCT. 8, 1917.
1,309,928.
Patented July 15, 1919.
4 SHEETS—SHEET 2.
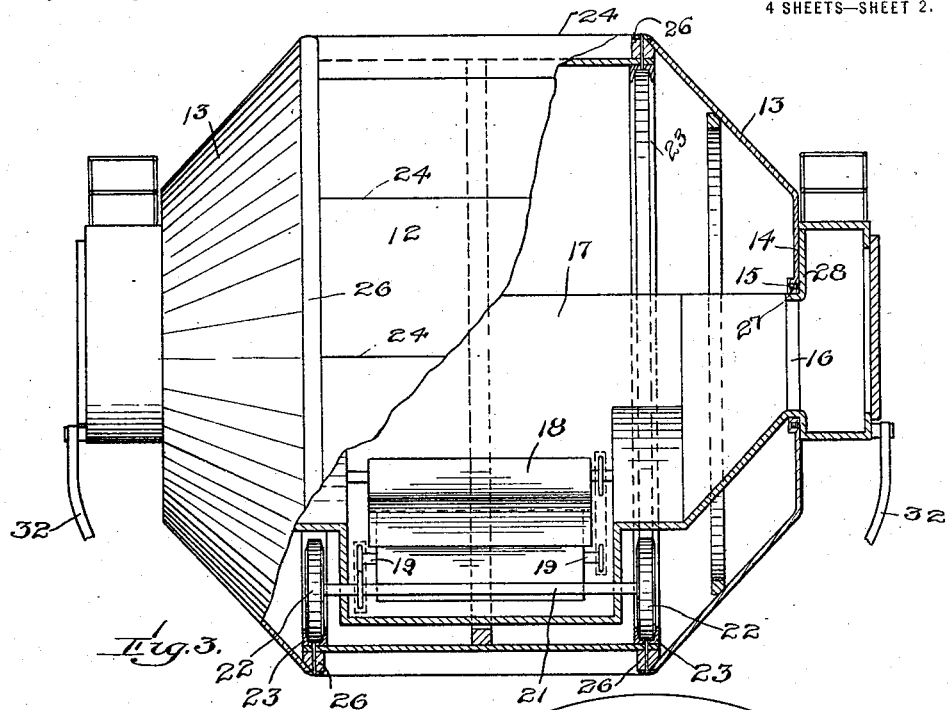
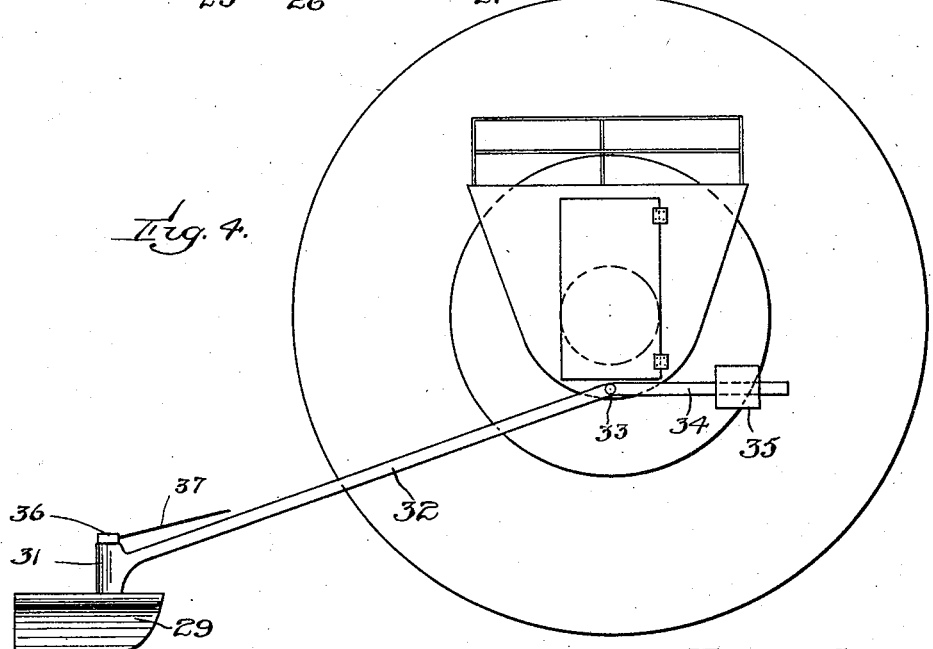
Inventor:
Merl R. Wolfard,
by Wright Brown Quimby May
Attorneys.

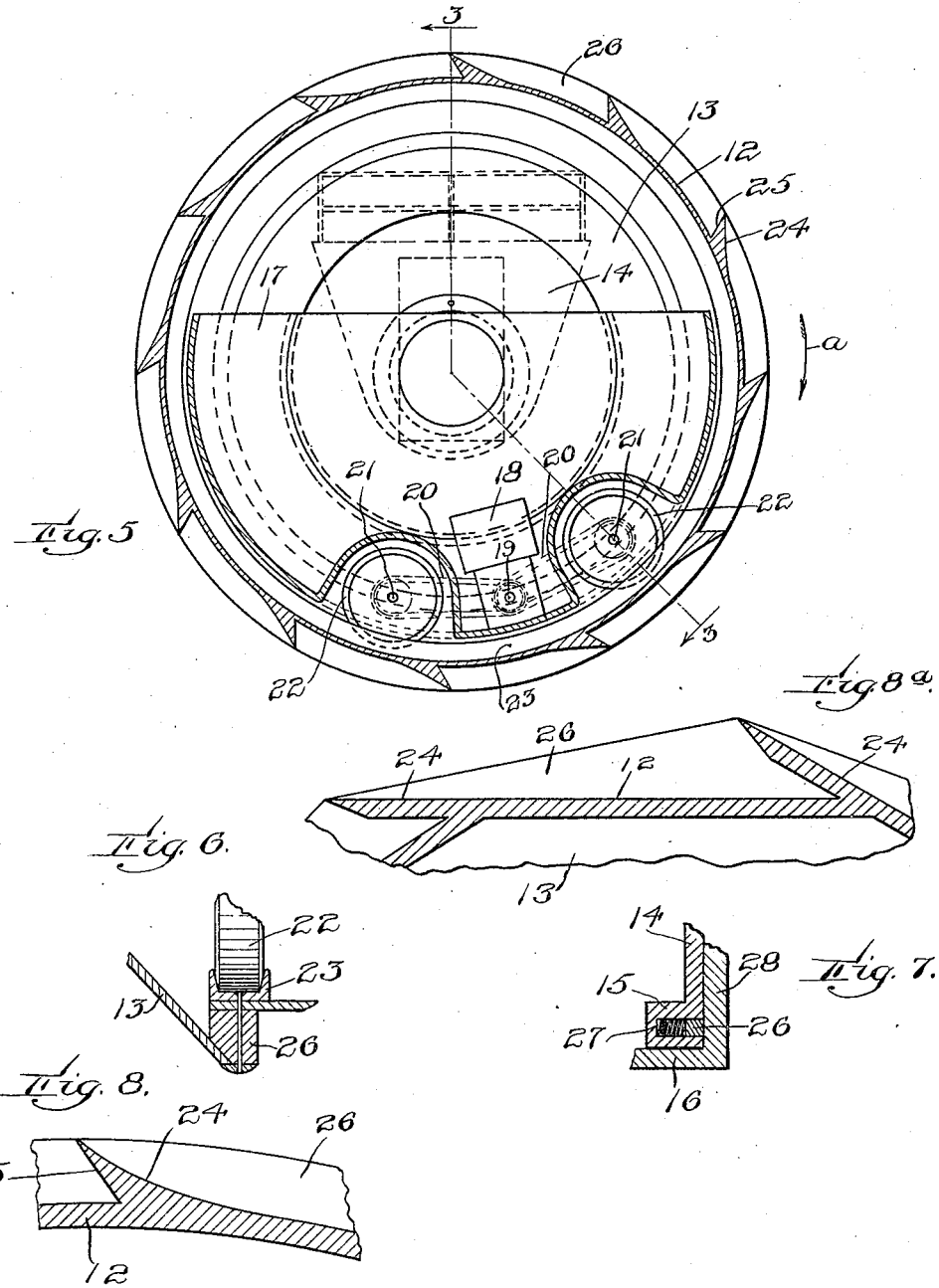

M. R. WOLFARD.
ROTARY HYDROPLANE.
APPLICATION FILED OCT. 8, 1917.
1,309,928.
Patented July 15, 1919.
4 SHEETS—SHEET 4.
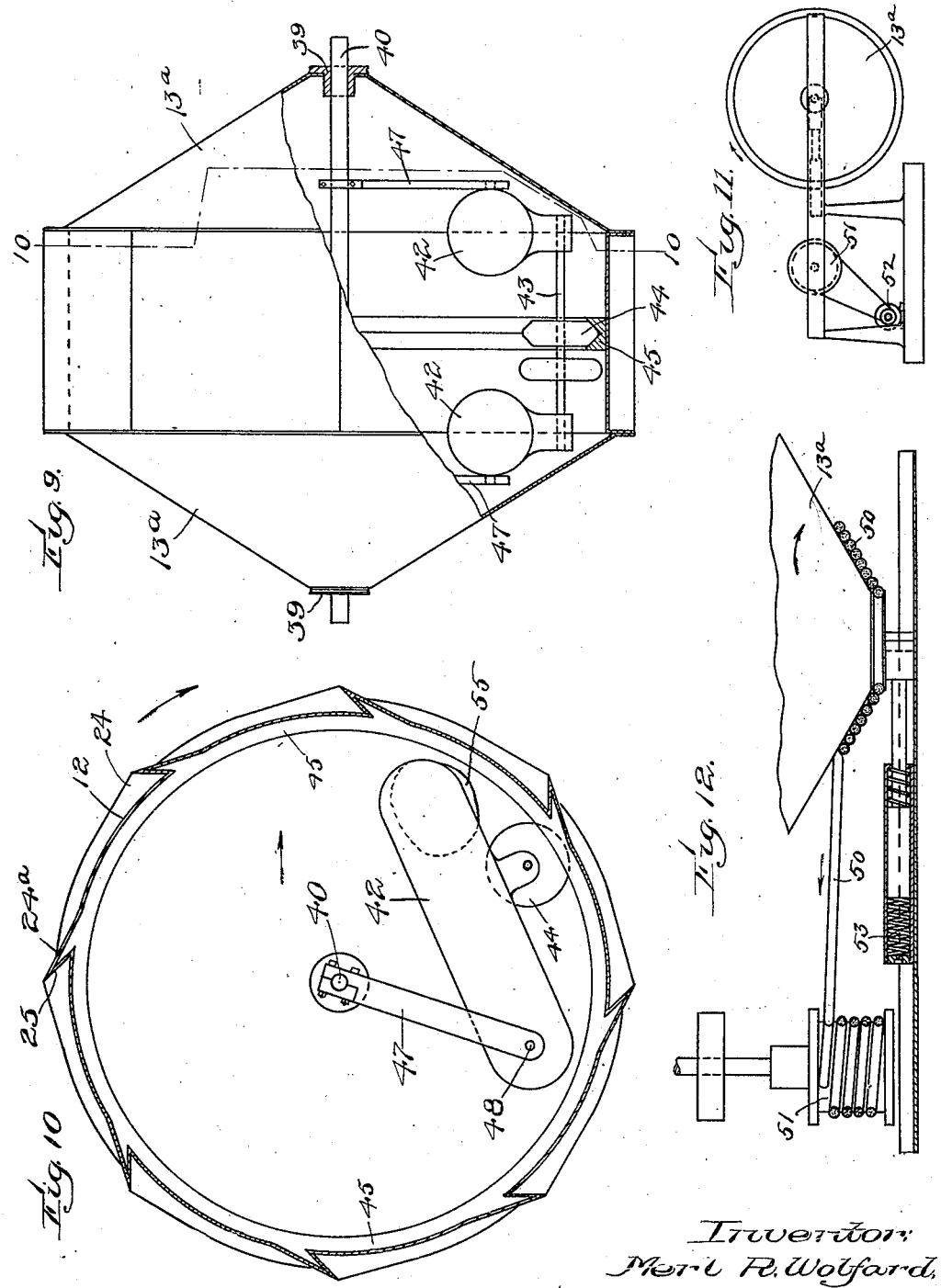

UNITED STATES PATENT OFFICE.

MERL R. WOLFARD, OF CAMBRIDGE, MASSACHUSETTS.

ROTARY HYDROPLANE.

1,309,928.  Specification of Letters Patent.  Patented July 15, 1919.

Application filed October 8, 1917. Serial No. 195,284.

*To all whom it may concern:*

Be it known that I, MERL R. WOLFARD, a citizen of the United States, residing at Cambridge, in the county of Middlesex and State of Massachusetts, have invented new and useful Improvements in Rotary Hydroplanes, of which the following is a specification.

This invention, in one sense, relates to improvements in mechanisms of the class commonly referred to as "rotary hulls" or "buoyant propellers" for ships, but its elemental characteristics are so different from what has been presented under these classifications that I have chosen to refer to the subject-matter as a rotary-hydroplane. This term is particularly applicable from another stand point, because this invention might be logically classed as relating to improvements in "hydroplanes"; but here again, unless the term "rotary" is prefixed, the subject-matter of the invention is not adequately suggested. The principles involved are primarily those of the hydroplane; that is, a float body is provided which when at rest is partially submerged, but when in normal action, weight is carried by an arrangement of approximately plane surfaces passing rapidly over essentially the surface of a body of water. In the hydroplane as usually constructed, however, the planes slope downward and backward and require separate propelling vanes to push them over the water; but as here provided the planes themselves, or a portion of each of them, is adapted to act as a propelling vane, and their propelling slope is downward and forward as referred to the direction of travel on the surface of the water. This direct application of the propelling force is made possible by arranging the planes or vanes in an endless series around a buoyant hull and providing means to rotate said series about an axis passing through the hull.

This ideal can be conveniently embodied in an effective structure by providing a buoyant rotatable hull with essentially a cylindrical perimeter and vanes attached to this perimeter in such manner that their propelling faces merge into the perimeter so as to form with it essentially a plane surface until the position of the next succeeding vane is reached. The interior of this hull may be arranged for occupancy by human beings, or it may be adapted to carry a heavy charge of explosive to a desired destination. This last adaptation of my invention I have chosen to refer to as a surface torpedo.

The invention as a whole is embodied in a rotary hydroplane, comprising a buoyant hull and an endless series of water-engaging planes or vanes driven by the hull, means being provided for driving the vanes in a continuous path, the series surrounding the perimeter of the hull, and each vane of the series being adapted to simultaneously propel and sustain the hull when the vanes travel at a high speed, so that the submergence of the hull is much less than when it is at rest.

The invention is also embodied in certain features relating to the form of the vanes, whereby the quantity of water lifted by their emergence from a body of water is so small as to be unobjectionable, and other useful results are obtained, and to means for preventing lateral escape of water between adjacent vanes.

Of the accompanying drawings forming a part of this specification,—

Figure 1 is a top plan view of a passenger-carrying hydroplane embodying the invention.

Fig. 2 is a section on line 2—2 of Fig. 1.

Fig. 3 is a rear elevation partly in section, on line 3—3 of Fig. 5.

Fig. 4 is an end elevation.

Fig. 5 is a section on line 5—5 of Fig. 1.

Figs. 6, 7 and 8 are fragmentary enlargements of Figs. 3, 4, and 5.

Fig. 8ª is a fragmentary sectional view illustrating a different form of retaining wall and vanes or planes.

Figs. 9 and 10 are views of a rotary hydroplane, the hull of which is closed air tight and constitutes the shell or casing of a surface torpedo, Fig. 9 being a side elevation partly in section, and Fig. 10 being a section on line 10—10 of Fig. 9.

Figs. 11 and 12 illustrate a mechanism for launching the hydroplane represented by Figs. 9 and 10.

The same reference characters indicate the same or similar parts in all of the figures.

In the embodiment of the invention shown by Figs. 1 to 8 inclusive, a rotary buoyant hull is provided, said hull including a substantially cylindrical central portion 12, and frusto-conical end portions 13 having annular side walls 14, (Fig. 3), the circular inner edges of which constitute housings 15 surrounding hollow tubular extensions 16, formed on a carriage structure 17 within the hull, the hull rotating about said extensions which are not normally in rubbing contact with said housings. The structure 17 may be provided with any suitable means for imparting rapid rotation to the hull. I have here shown somewhat diagrammatically, a motor 18, the shaft 19 of which has sprocket wheels connected with sprocket chains 20, mounted on two separate shafts 21 which are equipped with frictional driving wheels 22 engaging grooved annular tracks 23 attached to and located within the hull to rotate the latter.

I have associated with the hull an endless series of water-engaging vanes driven by the hull, the series surrounding the perimeter of the hull and each vane being adapted to simultaneously propel and lift or sustain the hull. As here shown, the vanes are attached to and projected outwardly from the perimeter of the hull portion 12, each vane being spaced from the next by a portion of said perimeter. Each vane has an acting face 24 which is so inclined relatively to a radial line from the axis of the hull to any part of said face, that the vanes are adapted to simultaneously propel and sustain the hull, the direction of rotation of the hull being as indicated by the arrow a (Fig. 5). The advancing or inner end of the face 24 is nearer the axis of the hull than the outer or following end. I have obtained good results by arranging the face 24 at an oblique angle of less than 45 degrees, with any radial line extending from the axis of the hull through any part of said face.

Each vane has a terminal face 25 intersecting the acting face 24, the relative arrangement of said faces being such that the quantity of water lifted by the emergence of the vanes from a body of water is unobjectionable. As here shown, the face 25 intersects the face 24 at an acute angle, the face 25 being undercut so that a portion of the face 24 overhangs it. When the vane is rising from a body of water the faces 24 and 25 leave the water without lifting a sufficient quantity to materially decrease the speed of rotation of the hull.

To increase the effectiveness of the propelling and lifting action of the blades, I provide annular retaining walls 26, which, as shown by Figs. 1, 3 and 5, are located at opposite ends of the vanes, the peripheries of said walls being substantially flush with the outer and rear ends of the vanes.

A different form of retaining wall is shown by Figs. 9 and 10, in which the retaining walls 24 are essentially as high as the vanes at the intersection of the terminal and acting faces of the latter, and reduced in height at 24$^a$ at the ends of the acting faces. This form has been found by experiment to be advantageous under certain conditions.

The acting faces 24 may be relatively straight, as indicated by Fig. 5, their forward ends joining the perimeter of the hull at a barely perceptible obtuse angle, or said faces may be curved, as indicated by Fig. 8, no angle being perceptible where they join the perimeter of the hull, or the perimeter of the hull itself may be polygonal, as indicated by Fig. 8$^a$, in which case the slope of the acting face of each vane is continuous to the next succeeding vane.

The bearings 15 may be provided with packing-rings 26$^a$ pressed by springs 27 against the inner walls 28 of hollow bridges attached to the extensions 16 and located at opposite ends of the hull.

The hull may be steered by a rudder 29 attached to a post 30 which is journaled in a bearing 31 attached to a frame composed of arms 32, pivoted at 33 to the bridge structures, said arms having extensions 34 provided with adjustable weights 35. The post 30 is provided with tiller arms 36 controlled by flexible cords or ropes 37 which may extend to one of the bridge structures. The rudder 29 is preferably hollow and buoyant, as indicated by Fig. 2, so that its submergence is limited.

Referring now to Figs. 9 and 10, illustrating the hull of a surface torpedo, it will be seen that the cylindrical portion 12 and the propelling and lifting vanes are substantially as hereinbefore described, the frusto-conical end portions 13$^a$ of the hull being provided with bearings 39 in which is journaled a shaft 40 on which the hull rotates, said shaft forming a part of a carrying structure within the hull, which structure includes suitable driving means which may utilize compressed air as the working agent, the air being stored in containers 42 and adapted to impart rapid rotation to the shaft 43 provided with the friction driving wheel 44 engaging a grooved annular track 45 attached to and within the cylindrical portion of the hull. The containers 42 may be connected with the shaft 40 by arms 47 fitted to turn loosely on the shaft 40, and pivoted at 48 to the containers. An explosive charge 55 may be carried in any convenient position, and as indicated in Fig. 10, between the forward ends of the air containers.

The vanes and retaining walls form a series of cavities adapted to entrain air and carry the entrained air beneath the hull. This air may be useful in either of two ways, i. e., it may act as a pneumatic cushion, tending to reduce vibrations in the hull as it moves over the surface of the water, or it may act to force water outwardly from said cavities, and thus aid materially in preventing water from clinging to the vanes as they emerge.

The launching mechanism comprises a cable 50 wound around each conical end 13<sup>a</sup> and adapted to be pulled from the under side by a hoisting drum 51 which may be driven by any convenient power mechanism such as a motor 52. The pull on the cable compresses the spring 53, which is duplicated at the other end also. When the cables are entirely unwound, the springs 53 launch the torpedo with some forward motion which should, however, not exceed the peripheral speed of the perimeter of the torpedo and my experiments indicate that it is much better if the peripheral speed considerably exceeds the forward launching speed of the axis. When the cable is unwound, its outer end separates from the torpedo.

I claim:

1. A rotary hydroplane comprising a buoyant hull, and an endless series of water-engaging vanes, the series surrounding the hull, means being provided for impelling the vanes, said vanes sloping outward and backward as referred to the direction of rotation, and their number, height and slope being such as will simultaneously sustain and propel the hull substantially on the surface of a body of water, when traveling at a high speed.

2. A rotary hydroplane comprising a buoyant hull, an endless series of water-engaging vanes, the series surrounding the hull, means being provided for impelling the vanes, each vane having an acting face which is inclined outward and backward as referred to the direction of rotation, so that the vane is adapted to simultaneously propel and lift the hull during acceleration of the movement of the vanes, and to simultaneously propel and sustain the hull substantially on the surface of a body of water while traveling at high speed.

3. A rotary hydroplane comprising a buoyant hull, an endless series of water-engaging vanes, the series surrounding the hull, said vanes sloping outward and backward as referred to the direction of rotation, and their number, height and slope being such as will simultaneously sustain and propel the hull substantially on the surface of a body of water, when traveling at a high speed, retaining walls associated with said vanes and adapted to prevent lateral escape of fluid between adjacent vanes, said retaining walls and adjacent vanes forming a series of cavities adapted to entrain air and carry the same beneath the hull.

4. A rotary hydroplane comprising a buoyant rotatable hull having a substantially cylindrical perimeter concentric with its axis, means for rotating the hull, and an endless series of water-engaging vanes attached to said perimeter, said vanes sloping outward and backward as referred to the direction of rotation, and their number, height and slope being such that the vanes, conjointly with said perimeter, will simultaneously sustain and propel the hull substantially on the surface of a body of water, when traveling at a high speed.

5. A rotary hydroplane comprising a buoyant rotatable hull the form and buoyancy of which permit the raising of the hull by propelling force exerted thereon, said hull having a substantially cylindrical perimeter concentric with its axis, means for rotating the hull, and an endless series of water-engaging vanes attached to said perimeter, each vane having an acting face which is inclined outward and backward as referred to the direction of rotation, so that the vane is adapted to simultaneously propel and lift the hull during acceleration of the same.

6. A rotary hydroplane comprising a buoyant rotatable hull having a substantially cylindrical perimeter concentric with its axis, means for rotating the hull, an endless series of water-engaging vanes attached to said perimeter, said vanes sloping outward and backward as referred to the direction of rotation, and their number, height and slope being such that the vanes, conjointly with said perimeter, will simultaneously sustain and propel the hull substantially on the surface of a body of water, when traveling at a high speed, annular retaining walls attached to the hull at opposite ends of the vanes and adapted to prevent lateral escape of fluid between adjacent vanes, said retaining walls and adjacent vanes forming a series of cavities adapted to entrain air and carry the same beneath the hull.

7. A rotary hydroplane comprising a buoyant rotatable hull having a substantially cylindrical perimeter concentric with its axis, means for rotating the hull, an endless series of water-engaging vanes attached to said perimeter, said vanes being inclined outward and backward as referred to the direction of rotation, and being adapted conjointly with said perimeter, to simultaneously propel and sustain the hull substantially on the surface of a body of water while traveling at high speed, annular retaining walls attached to the hull at opposite ends of the vanes and adapted to prevent lateral escape of fluid between adjacent vanes, said retaining walls being essentially as high as said vanes at the intersection of the terminal and acting faces, and reduced in height at the ends of the acting faces.

In testimony whereof I have affixed my signature.

MERL R. WOLFARD.